(12) United States Patent
Jackson et al.

(10) Patent No.: US 12,744,684 B2
(45) Date of Patent: Sep. 22, 2026

(54) MULTIPLE ORDINALS IN ONE TRANSMISSION

(71) Applicant: DMG Blockchain Solutions Inc., Delta (CA)

(72) Inventors: William Jackson, Kingston (CA); Wei Jiang, Calgary (CA); Adrian Glover, Surrey (CA)

(73) Assignee: DMG BLOCKCHAIN SOLUTIONS INC. (CA)

( * ) Notice: Subject to any disclaimer, the term of this patent is extended or adjusted under 35 U.S.C. 154(b) by 156 days.

(21) Appl. No.: 18/615,210

(22) Filed: Mar. 25, 2024

(65) Prior Publication Data

US 2024/0348460 A1 Oct. 17, 2024

Related U.S. Application Data

(60) Provisional application No. 63/516,480, filed on Jul. 28, 2023, provisional application No. 63/492,164, filed on Mar. 24, 2023.

(51) Int. Cl.
*H04L 9/00* (2022.01)

(52) U.S. Cl.
CPC .................................... *H04L 9/50* (2022.05)

(58) Field of Classification Search
CPC ................................ H04L 9/3239; H04L 9/50
See application file for complete search history.

(56) References Cited

U.S. PATENT DOCUMENTS

2023/0129227 A1* 4/2023 Karlapalem .............. H04L 9/50 713/168
2024/0113877 A1* 4/2024 Allen ..................... G06Q 10/06
2024/0291678 A1* 8/2024 Wright .................... G06F 21/64
2024/0370865 A1* 11/2024 Bernardi ............... G06Q 20/36

* cited by examiner

*Primary Examiner* — Mohamed A. Wasel
(74) *Attorney, Agent, or Firm* — ASHURST PERKINS COIE US LLP; Colin Fowler

(57) ABSTRACT

Systems and methods for hashing ordinals under a modified blockchain protocol for blockchain events following ordinal theory. Ordinal identifiers are assigned to unspent inputs for a blockchain event. Content associated with multiple ordinals are embedded into data fields of the unspent inputs, which are then transferred to blockchain event outputs. The blockchain event outputs, including the embedded content associated with the multiple ordinals, are hashed into a block, which is broadcasted for appending to a blockchain data structure according to the modified blockchain protocol.

20 Claims, 9 Drawing Sheets

MULTIPLE ORDINALS IN ONE TRANSMISSION

CROSS-REFERENCE TO RELATED APPLICATIONS

This application claims priority to, and the benefit of, U.S. Provisional Application No. 63/492,164 entitled "MULTIPLE ORDINALS IN ONE TRANSMISSION" filed Mar. 24, 2023, this application also claims priority to, and the benefit of, U.S. Provisional Application No. 63/516,480 entitled "MULTIPLE ORDINALS IN ONE TRANSMISSION" filed Jul. 28, 2023, the aforementioned applications are incorporated by reference herein in their entirety.

TECHNICAL FIELD

The disclosure relates to operation of a pool of hashing processors and more particularly to structural requirements of forming blocks in a blockchain data structure.

BACKGROUND

Some blockchain systems record movement of cryptographic objects between cryptographic identifiers and operate on distributed consensus networks. A blockchain is an immutable, append-only public ledger. A benefit of such a data structure is that it is reliable, secure, and open. Further, within the distributed consensus networks, there tend to be congregations of processing power referred to as pools. The pools use ASIC processors designed for hashing to more efficiently generate the block data structures from available events. However, current systems lack the ability to customize the pools that process transactions, which limits the flexibility of the types of transactions processed.

DETAILED DESCRIPTION

Figure 1:
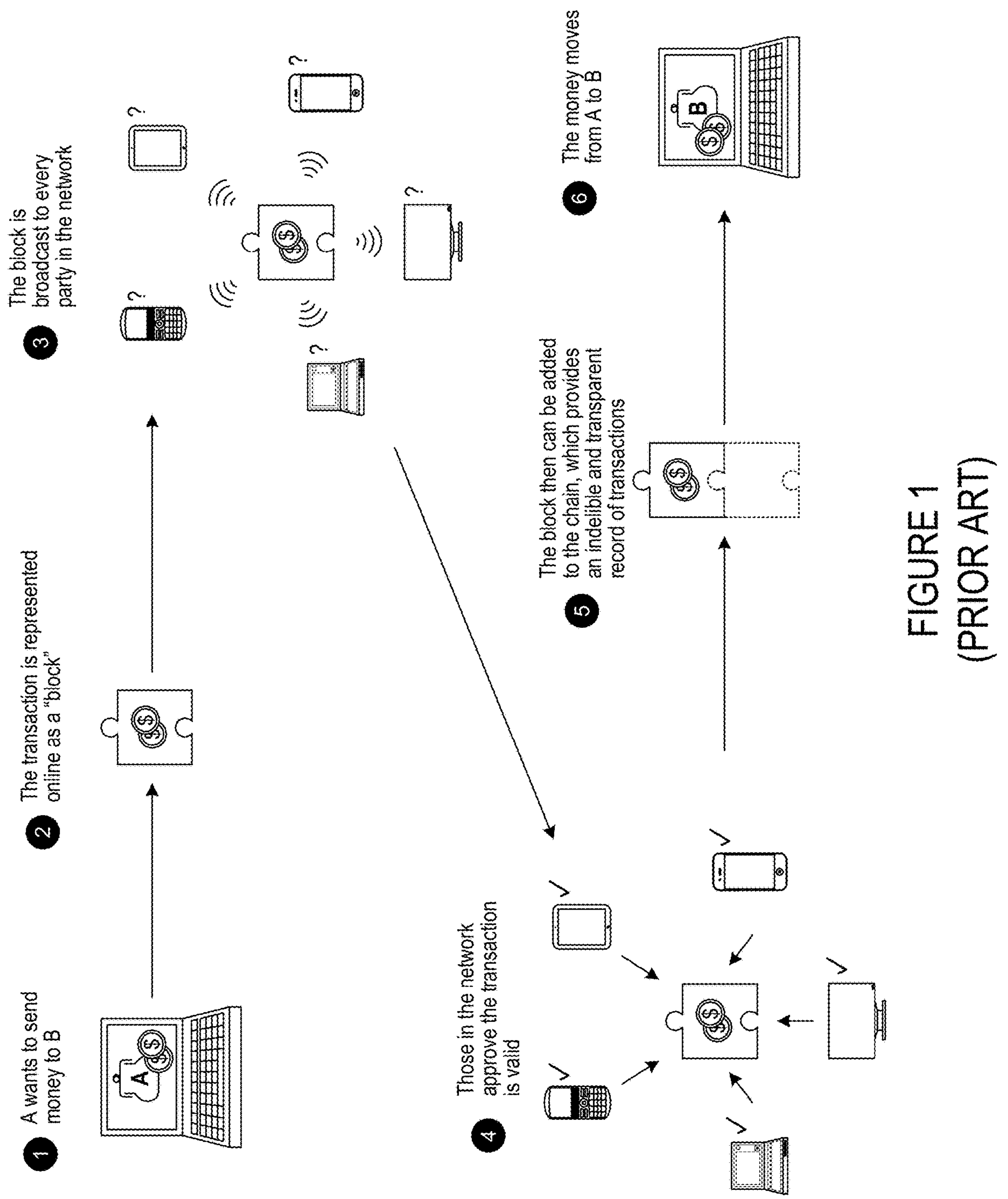
FIG. 1 is a block diagram of a blockchain data structure.

In block creation, a miner generally requests a "block template" from a full node on a distributed consensus network. This block template will have a list of events that exist in the mempool. The mempool is where all valid events wait to be confirmed by the entire distributed consensus network. Described herein a filter node will review the list of events, looping through each one as new events are added, and create a list of all the cryptographic identifiers that are associated with each event. The filter node applies a custom protocol to a given node on a public blockchain (e.g., Bitcoin, Ethereum, etc.). The custom protocol is independent of and compatible with the public blockchain protocol. The custom protocol affects how a given node (or set of nodes) behaves and interacts with the greater distributed consensus network; however, the custom protocol does not interfere with the ability of the given node to interact with the public blockchain protocol. As used herein, nodes and hashing processors are also known as miners.

In examples described herein, the custom protocol is directed to batching ordinal transactions. Ordinal transactions follow an ordering system that assigns transaction inputs to outputs in a first-in first-out manner and support inscription of arbitrary content (e.g., videos, images, audio data, etc.) in the witness data field. Transactions or events that include one or more ordinals and/or inscriptions are not propagated to mempools of others and, instead, are batched and prepared into blocks that include multiple ordinals. A reason for batching events that are associated with ordinals and/or inscriptions is to focus multiple ordinal events of a given user toward a single block so that such events can all be processed in accordance with ordinal theory.

TERMINOLOGY

An entity is any person or company, or merely a reference to either, that owns the private keys to a public address (cryptographic identifier).

The Bitcoin mempool (short for memory pool) is a collection of all Bitcoin transactions ("event") awaiting verifications and confirmation which will be included in the next block. Whenever a Bitcoin transaction is channeled to the network, it first gets verified by all the Bitcoin nodes available, which takes an average of 10 minutes to get its first verification. It can take longer than 10 minutes, depending on the pending transactions that are in the mempool. The mempool is the node's maintaining and restraining area that focuses on transactions awaiting approval. When one transaction gets verified and included, the next one is in line to get added. Cryptocurrencies other than Bitcoin operate using mempools as well. Bitcoin is referenced here as an example.

The collection of these transactions is called a "block" and whichever miner first solves the math problem gets to add this block to Bitcoin's blockchain. However, if the size of the Bitcoin mempool is high, transaction fees recommended by exchanges go up to improve the rate. A given user is enabled to choose how expensive they wish to transaction fee to be. If one sets the fee higher than average, chances are that transaction will be confirmed quicker. Failing to attach high fees could result in a transaction being delayed for many days if the memory pool does not clear.

An Exchange is an entity that operates a plurality of addresses. Even though a customer of an exchange is given a deposit address, the address is truly owned by the exchange rather than by the customer, since the exchange controls the private keys to that address.

A wallet is the set of addresses (or cryptographic identifiers) belonging to a single entity (or set of entities, to accommodate multisig addresses). In some instances, an entity has multiple wallets, as in the case of an exchange that stores some value in "cold" storage wallets, and some in "hot" storage.

Although one can partition addresses into wallets, there is difficulty identifying the entities that own them. However, the system can sometimes identify at least the category of the (unknown) entity that owns the wallet. Clues about the wallet's category often come from topological properties about its transactions. For example, to the extent that a given transaction exemplifies mixing, the system can then further infer that the input and output addresses belong to a mixer.

Finally, we define hops among entities (or wallets). Two entities are one hop from each other precisely when there exists a single transaction between them. This forms a directed graph of entities. We say that entities that are n hops away from one another if the shortest path connecting them (ignoring direction) has n edges.

A wallet's transactional neighborhood is the set of wallets that have transacted with the given wallet, plus those that have transacted with that wallet's transactors, and so on. While there is no strict limit to the number of hops that constitute the neighborhood, an intuitive definition is "less than the entire network of wallets, and more than just a single wallet."

FIG. 1 is a block diagram of a blockchain data structure. Cryptocurrency networks operate on a distributed network architecture. Key to understanding cryptocurrency is the data structure upon which the network operates. For example, the Bitcoin and Ethereum networks use a data structure referred to as a blockchain.

The blockchain includes a history of all transactions that have ever occurred on the network. Each full node in the distributed network holds a full copy of the blockchain. To participate in the network at all, the blockchain history must be consistent with the history of at least a majority of other nodes. This consistency rule has an important effect of causing the blockchain to be immutable. In order to effectively attack a blockchain, one must control 51%+ of the processing power of the entire network. Where the network is comprised of thousands of nodes, assembling the requisite 51% is exceedingly difficult.

Many nodes tend to group together to form pools. Often these pools operate large warehouses of ASIC hashing processors, specifically designed to efficiently solve math problems that generate hash values. While it is true that many nodes often group together in pools that together work together to solve for nonces to propagate the blockchain, the grouped nodes of the pool do not necessarily share common control. While they have agreed to pay any mined coins to a central pot that is shared amongst the pool, this is far and away from agreeing to make changes to the blockchain.

When a given node intends to generate a transaction, the transaction is propagated throughout the nodes, via the mempool, until it reaches a node or group of nodes that can assemble that transaction and other transactions generated during a contemporaneous period of time into a block. Until a transaction appears in a block it is not published or public. Often a transaction isn't considered confirmed until 6 additional blocks have been added.

Bitcoin blocks are typically limited to the size of 1 MB and are generated approximately every 10 to 15 minutes. This illustrates an important limitation of the Bitcoin network, that it only processes approximately 7 transactions per second. Conversely, Ethereum limits block size based on the amount of processing the contracts in the given block call for and are appended every 5 to 15 seconds. While cryptocurrency networks technically begin processing transactions in real-time, and the existence of a block including a given transaction verifies that transaction's authenticity, until that block is published to the blockchain, the transaction is not verified.

Thus far, Bitcoin has been discussed as a network for trading Bitcoins. However, Bitcoin transactions have additional utility in that they can embed additional data. As contemplated above, Bitcoin can be used to purchase and record the existence of data at a given point in time. Recording data is performed by including hashed data within an output field of a given transaction. In this manner, the proof of existence for any document or recorded data may be embedded into the immutable history of the blockchain. Further, certain upgrades to Bitcoin have relaxed the previous limitations on block size. For example, the Segregated Witness (SegWit) upgrade segregated Bitcoin transactions into two sections by separating the signature portion and instead adding a witness data field at the end of a block. The creation of the witness data field expanded the amount of arbitrary content that could be placed inside a Bitcoin transaction and allowed for support of ordinals and/or inscriptions in blocks.

Systems that utilize the Bitcoin blockchain to transfer the ownership of non-coin assets require software that is separate from and merely relies upon the immutability of the blockchain. The separate software is not necessarily secure or immutable itself. Extra-blockchain software is thus an inherent weak point in a system that relies upon the immutability of the blockchain to ensure security. Ethereum takes the ability to buy and sell non-coin assets a step further.

Ethereum smart contracts are in effect software that runs on the blockchain. That software is open source and subject to inputs that are related to the blockchain itself. Of course, one can still write code including vulnerabilities, but the platform enables greater security and fewer weak links in the chain.

Figure 2:
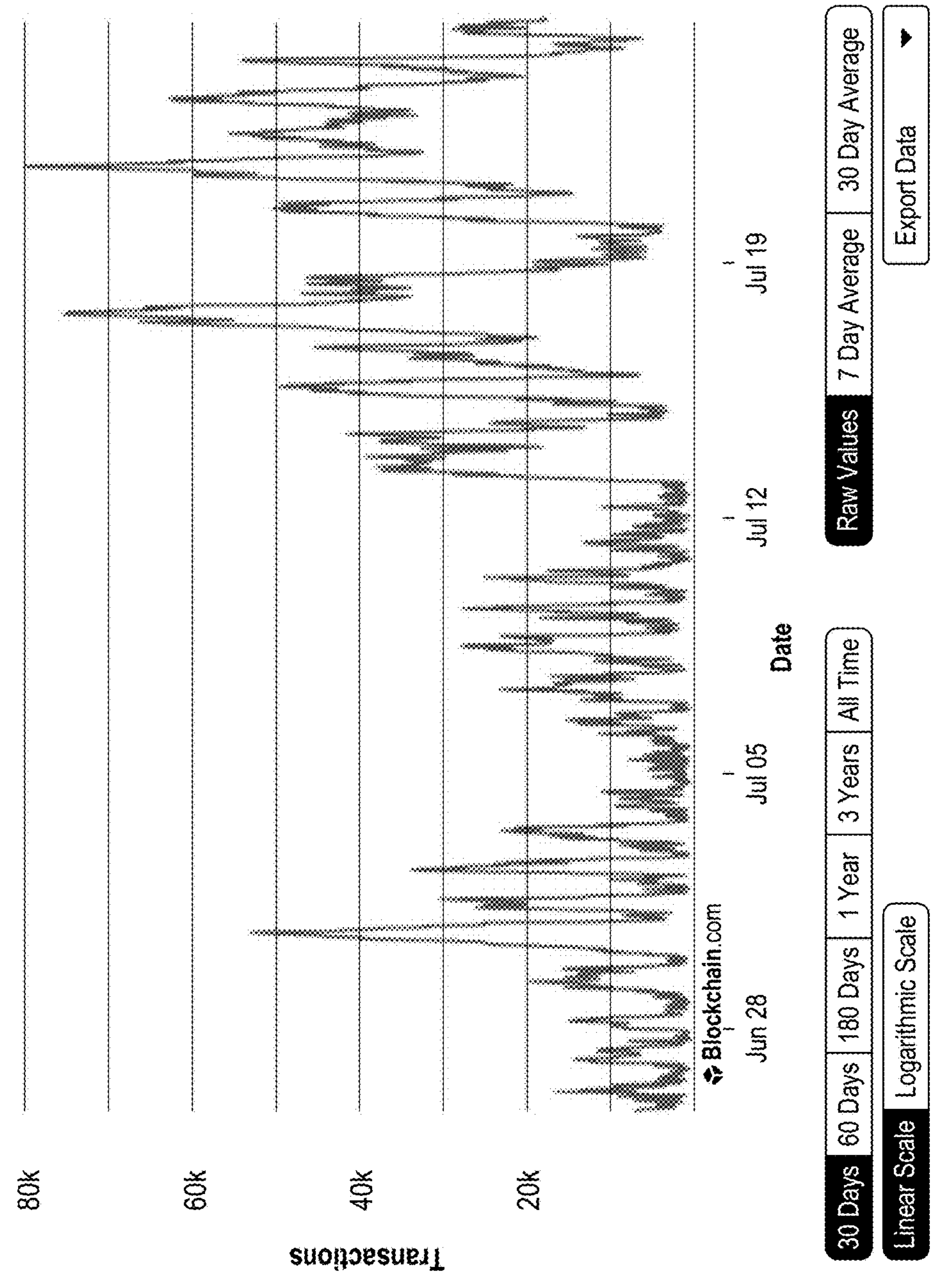
FIG. 2 is an illustration of a mempool.

FIG. 2 is an illustration of the Bitcoin mempool over time. The Bitcoin mempool is portrayed here as an example. Other cryptographic objects make use of similar mempools. The mempool is where all valid transactions wait to be confirmed by the cryptographic object network. A high number of transactions in the mempool indicates a congested traffic which will result in longer average confirmation time and higher priority fees. The mempool count metric tells how many transactions are causing the congestion whereas the mempool Size (Bytes) chart is a better metric to estimate how long the congestion will last.

In order to be confirmed, a transaction from the mempool needs to be included in a block. Unlike the maximum size of a block which is fixed, the maximum number of transactions which can be included in a block varies, because not all transactions have the same size.

Each Bitcoin node builds its own version of the mempool by connecting to the Bitcoin network. The illustrated mempool content is aggregated from a few instances of up to date Bitcoin nodes maintained by the Blockchain.com engineering team. However, in a disclosed filter node, the mempool may look different based on the treatment of ordinal inscriptions.

In some embodiments, the filter node's mempool executes a custom mempool protocol that batches ordinal transactions. Transactions or events that include one or more ordinals and/or inscriptions are not propagated to mempools of others and, instead, are batched and prepared into blocks that include multiple ordinals. A reason for batching events that are associated with ordinals and/or inscriptions is to focus multiple ordinal events of a given user toward a single block so that such events can all be processed in accordance with ordinal theory. The resultant mempool may be smaller than the average mempool across the relevant distributed consensus network because only ordinal transactions processed, or the cumulative effect of the filter node selectively processing transactions may lead to the cumulative mempool becoming much larger across the distributed consensus network.

Figure 3:
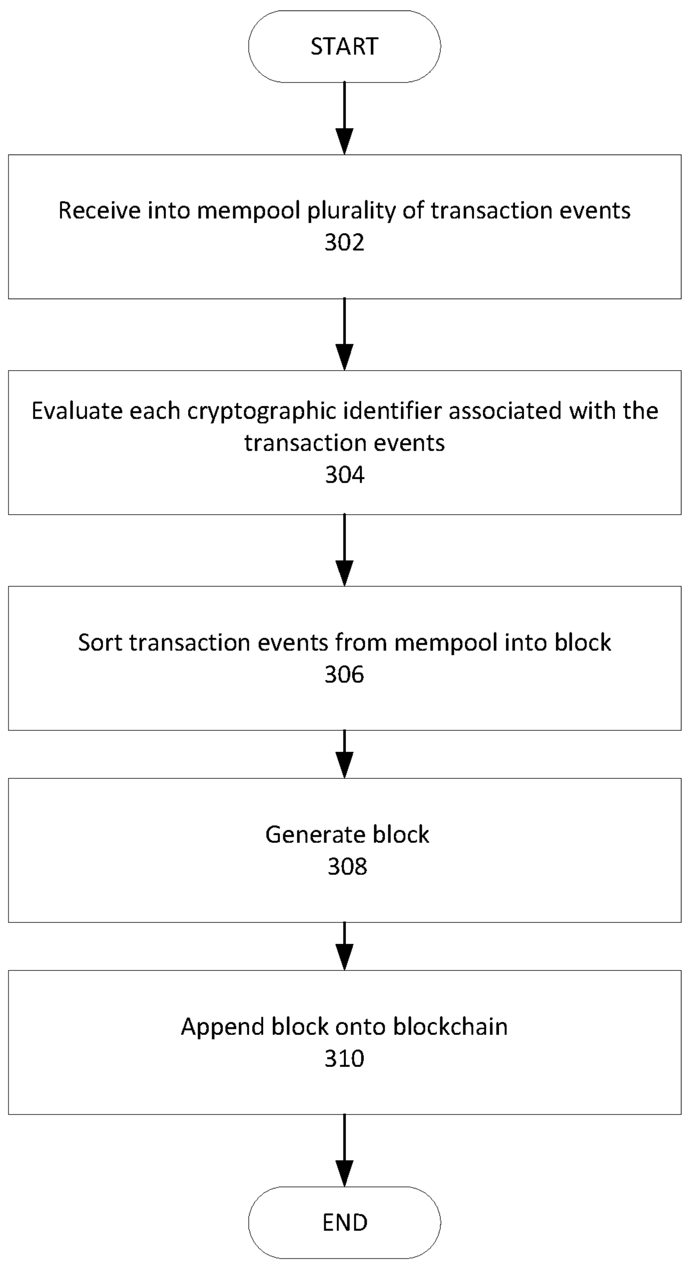
FIG. 3 is a flowchart illustrating exclusion of cryptographic identifiers from inclusion into blocks.

FIG. 3 is a flowchart illustrating exclusion of cryptographic identifiers from inclusion into blocks. In step 302, the mempool for the distributed consensus network receives a plurality of transaction events. The mempool is made up of a number of nodes. The mempool for each node may differ. A group of nodes may assemble together into a pool, that works together. The nodes of a pool are operated by ASIC hashing processors specifically designed to compute hash values efficiently. The nodes operating the method described herein are filter nodes.

Each of the transaction events include a cryptographic identifier associated with an input and/or output of the transaction. Some transaction events include additional cryptographic identifiers. The cryptographic identifiers are often referred to as "public keys." The transaction events are collected together (based on memory size) and used to form blocks in a blockchain.

Some transactions involve ordinals and inscriptions. Ordinals and inscriptions provide a way to add arbitrary content (e.g., videos, images, audio data, etc.) to an individual satoshi on the blockchain, where a satoshi is equivalent to the smallest possible unit of Bitcoin. Ordinals follow an ordering system that enables differentiation amongst satoshis by assigning each satoshi a unique identifier (e.g., unique ordinal number) based on the order in which it was mined. An inscription is the arbitrary content that is inscribed to a satoshi, typically by being embedded into the witness data section of a transaction. Inscriptions are unchangeable once inscribed and are meant to be durable, secure, and decentralized like Bitcoin. An ordinal inscribed with arbitrary content can be held in a Bitcoin wallet (e.g., Taproot-compatible wallet) and transferred using typical Bitcoin transactions. Ordinals and inscriptions do not require any changes public blockchain protocol and are compatible with the existing public blockchain protocol.

Several updates to Bitcoin led to the support of ordinals and inscriptions on the blockchain. For example, the Segregated Witness (SegWit) update added a witness data field at the end of a block to which inscription content is added. Further, the Taproot upgrade provided a new transaction output type called Pay-to-Taproot (P2TR), a type of script, and a collection of operation codes (opcodes) for executing commands on the Bitcoin protocol. These opcodes removed the cap on script size limits, allowing for larger scripts and greater flexibility. While only limited textual content could be added to transactions previously, the Taproot upgrade expanded the types of content (e.g., videos, images, audio, games, etc.) that could be put onto the blockchain.

In step 304, the filter nodes that make up the pool of hashing processors evaluate each of the transaction events in the mempool based on each respective cryptographic identifier used by each of the transaction events. The cryptographic identifiers are evaluated based on whether they are associated with ordinal transactions (e.g., whether corresponding events include ordinal inscriptions). In some embodiments, the evaluation is performed on a constant basis as new transaction events are added to the mempool. In some cases, the filter nodes evaluate whether cryptographic identifiers are associated with ordinal inscriptions by determining that corresponding transaction events include ordinal identifiers (e.g., unique ordinal numbers). Such ordinal identifiers indicate that the transaction supports ordinal inscriptions and should be processed by miners that are able to process ordinal inscriptions. In other embodiments, the evaluation can be instead or additionally performed by the filter nodes determining that corresponding transaction events include certain opcodes (e.g., OP_FALSE, OP_PUSH), which indicate sections meant for storing inscription content.

In step 306, the filter nodes sort through the plurality of events and identifies those to include into a block. As described above with respect to step 304, the filter nodes evaluate whether cryptographic identifiers are associated with ordinal transactions. Once the filter nodes determine that a cryptographic identifier is associated with ordinal transactions, the filter nodes execute a custom protocol that does not propagate such ordinal transactions to mempools of others. Instead, such transactions are batched and prepared into blocks that include multiple ordinals. This helps focus multiple ordinal inscription to single block so that they can all be processed in accordance with ordinal theory.

In step 308, the filter node generates the block using those transaction events that have been sorted for inclusion. In step 310, the newly generated block is appended to the blockchain.

Custom Mempool Protocol

Some embodiments disclosed herein involve introducing a transaction event (an "event") to a blockchain ledger without first broadcasting the event to all nodes on the greater blockchain network via transmission to a select set of nodes/miners/hashing processors. Targeting a given set of miners creates another way in which an originator of an event (a user) requests that events be added to a mempool that is stored on a node. The result of targeting a specific set of miners for dissemination of an event is that a given user achieves some intentionality or agency into which events appear in the same blocks on the blockchain as with their events. Some embodiments involve an application interfacing with a custom node executing a custom mempool protocol.

A customized node for the blockchain stores a mempool of a set of hashing processors executing a custom mempool protocol. The custom node receives events through an application program interface (API) (e.g., developed for ordinal transactions). The custom node verifies an event based on the cryptographic hash included with the event. However, under the custom mempool protocol, the custom node will refrain from broadcasting or propagating any events that are received through the API to mempools of nodes that are not executing the custom mempool protocol. Thus, events that are submitted via the application to the custom node are known to the custom node alone, and not to the rest of the greater blockchain network until such events are appended in blocks to the blockchain. The mining pool network (pool of hashing processors) associated with the custom node receives events that are submitted through the API into a collective mempool of that subset of miners i.e., the list of events that are waiting to be mined. Thus, only miners that are part of the mining pool associated with the custom node confirm events submitted through the API.

Users submit events through a custom application. In some embodiments, the application is a custodial wallet that enables users to submit their events to a blockchain through a web user interface. Events are digitally signed by a cryptographic private key of the user (e.g., using a hardware private key device that connects through the web user interface, custodial private key database, direct input etc.) according to the public blockchain protocol. The user submitted events are then submitted through the API to the custom node that processes the event according to the custom mempool protocol.

Some embodiments enable the custom node to process events received from the greater blockchain network. The custom node communicates information to and from neighboring nodes, some of which may not be executing the custom mempool protocol. When the custom node receives events from other nodes that are not executing the custom mempool protocol, the custom node performs a filtering process on these events. In some embodiments, the custom node only allows events with parameters satisfying a screening criterion to be further processed by the custom node. In some cases, the screening criterion only allows events associated with ordinal transaction to be further processed by the custom node. Evaluation under the screening criterion can involve determining whether events include ordinal identifiers (e.g., unique ordinal number) and/or certain opcodes (e.g., OP_FALSE, OP_PUSH), which indicate storage of inscription content. In some embodiments, the screening criterion additionally only allows further processing by the custom node of events from the same requestor (e.g., same wallet or account). The screening criterion thus allows for batching of ordinal inscriptions from the same requestor on the same transaction block.

As a result, the miners of the custom node hash blocks use only events transmitted by the application or events satisfying the screening criterion. In some embodiments, the custom node only hashes blocks with events that that include ordinal inscriptions and/or originate from the same requestor. Thus, events transmitted through the application will not end up in the same block as other events that do not include ordinal inscriptions. As a result, the requestor achieves some intentionality or agency into which miners process their events and which events appear in the same blocks on the blockchain as with their events.

When a block is submitted to the blockchain network, verification of events via the custom node still operates in a manner that is compatible with the public blockchain protocol. For example, the public address of a user's event is generated by hashing the event using the public key of the user. Blocks produced via the miners of the custom node are hashed in the same way as other blocks on the blockchain (e.g., the block are of the same maximum size, and reference the last hash of the previous block of an existing chain). Thus, while the custom node executes a custom mempool protocol for processing events, the custom node still adds events transmitted by the application to the blockchain consistent with the existing public blockchain protocol.

A public or unmodified blockchain protocol refers to a set of protocols and network requirements that are controlled by influential developer groups and "voted" on by miners at large. For example, anyone can make changes to Bitcoin's code—it is open source. Getting the changes implemented, however, requires network consensus, and that is extremely difficult to achieve. Imagine trying to get 20 people with different philosophies, political convictions, economic incentives and life goals to agree on a simple change. Now, multiply that by hundreds if not thousands, make the changes complicated, and the endeavor becomes exceedingly difficult. This protects the network from any change other than those the majority believe are beneficial to the entire ecosystem.

Some changes can be made to the protocol without the consent of the majority at large. These changes do not directly impact the way the resulting blocks appear to the greater network. These changes are thus inherently more restrictive. A reasonable analogy is application of the supremacy clause of the U.S. constitution as applies to federal and state law. Federal law sets minimum requirements, but states can set laws that are more restrictive. Where there is conflict, federal law controls. Similarly, a public blockchain protocol dictates how blocks are generated, but a custom protocol may add additional restrictions and remain compatible with the public blockchain protocol.

Thus, the custom node exerts greater control over the blocks it generates than is otherwise required by the public protocol without requiring a hard fork of the blockchain. The custom node is therefore operating a different (more restrictive) protocol than many other nodes operating on the same consensus network (e.g., Bitcoin, Bitcoin Cash, Ethereum, Ethereum Classic, Litecoin, Ripple, Dogecoin, etc.).

Some embodiments disclosed herein allow the user more say over which mining pool or subset of the mining pool is able to process and confirm their event. Instead of being processed by unknown nodes throughout the greater blockchain network, events transmitted through the application are processed by the custom node executing the custom mempool protocol before being added to the blockchain. There is more information available about the miners associated with the custom node. In some cases, the information includes whether miners are able to process transactions in accordance with ordinal theory.

In some embodiments, miners have been vetted through a screening process that removes any undesirable miners. Thus, by submitting their events through the application, users have their events processed by a limited set of hashing processors. The result of targeting a specific set of miners for dissemination of an event is that a given user achieves some intentionality or agency into which events appear in the same blocks on the blockchain as with their events and which miners process their events.

In some embodiments, users further choose which miners within those executing the custom mempool protocol process and confirm their event. For example, a user inputs parameters for an event to indicate a set of hashing processors that is to process the event. In some cases, the parameters include information indicating that the user wants their event to be processed only by miners that are willing and able to process events that include ordinal inscriptions. The application then interfaces with the custom node to ensure that the event is processed only by such miners, which allows the user to further limit the miners that process their event. The user thus achieves intentionality into which events appear in the same blocks on the blockchain on with their events.

Figure 4:
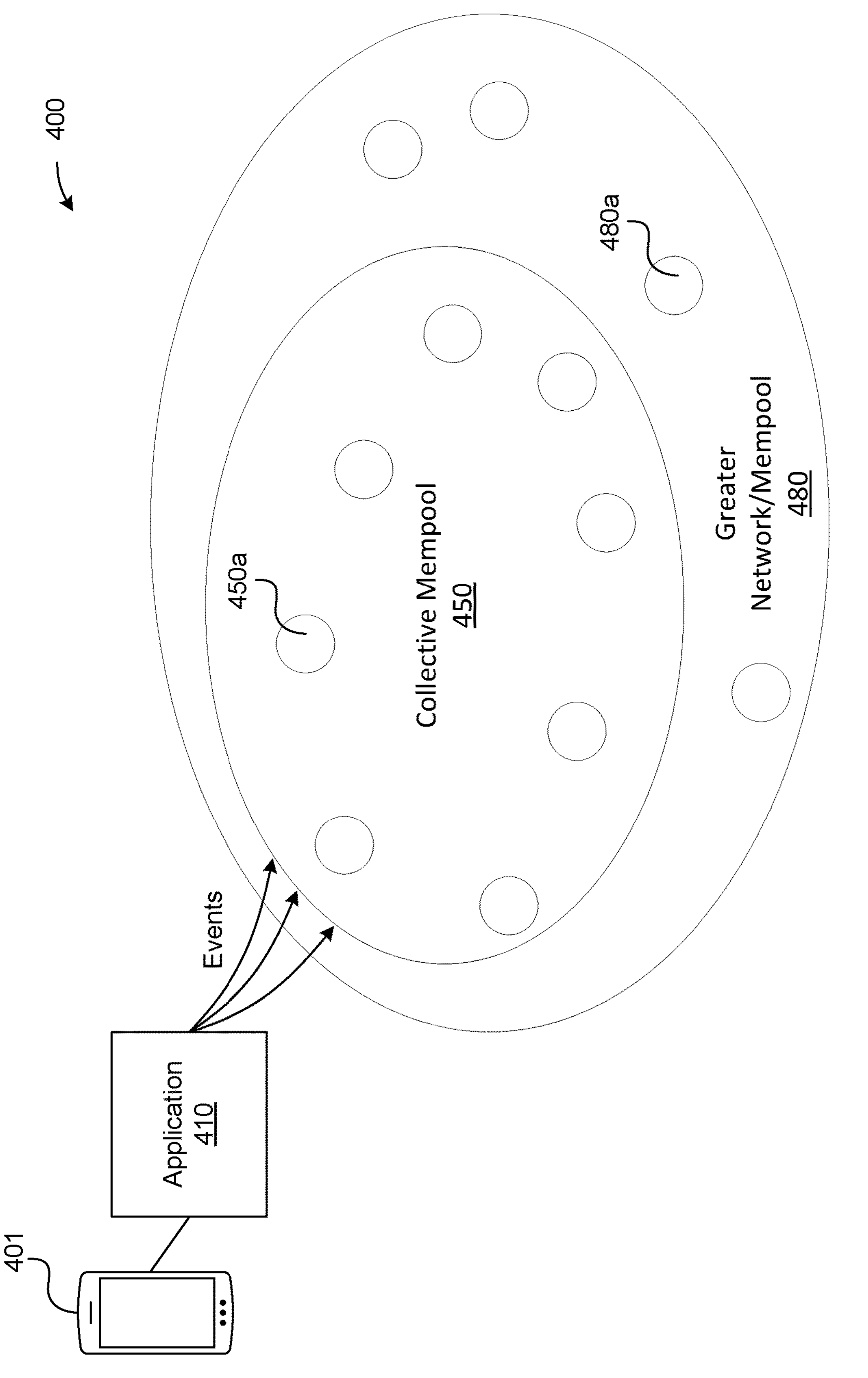
FIG. 4 is a diagrammatic representation of a system with a collective mempool for processing events transmitted by an application.

FIG. 4 is a diagrammatic representation of a system 400 with a collective mempool 450 for processing events transmitted by an application. System 400 includes a user device 401 running an application 410, that transmits events to collective mempool 450 which is part of a greater network/mempool 480. Collective mempool 450 is a mempool of a set of hashing processors 450*a* executing the custom mempool protocol. Greater network/mempool 480 is the mempool of hashing processors of the greater blockchain network (e.g., the Bitcoin or Ethereum network), including those executing the public blockchain protocol but not the custom mempool protocol. Hashing processors are associated with nodes that group together to form pools as described herein. Nodes associated with collective mempool 450 and are executing the custom mempool protocol are also known as filter nodes as described herein. Depicted in the figure, hashing processors 450*a* is part of a pool of hashing processors corresponding to collective mempool 450 and hashing processors 480*a* is part of a pool of hashing processors corresponding to the greater network/mempool 480. Each node has its own mempool and holds a full copy of the blockchain.

The depiction in FIG. 4 is for exemplary purposes only and is not intended to be limiting. For example, system 400 includes a plurality of user devices running application 410, each transmitting events or other information to collective mempool 450. Further, collective mempool 450 and greater network/mempool 480 includes a different number of nodes than depicted in FIG. 4. Characteristics described with respect to hashing processors 450*a* apply to other hashing processors associated with collective mempool 450 and that are executing the custom mempool protocol. Characteristics described herein with respect to hashing processors 480*a* apply to other hashing processors that are part of the greater network/mempool 480 and that are executing the public blockchain protocol.

User device 401 is a device operated by a user and that runs application 410. User device 401 communicates information to and from collective mempool 450 over a suitable network interface. Examples of user device 401 include a mobile phone, tablet device, personal computer, or the like.

Application 410 is software that enables processing of events by a custom node executing the custom mempool protocol. Application 410 runs on user device 401 and communicates information over an API developed for ordinal transaction events. Application 410 receives user input from user device 401 and transmits events or other information to collective mempool 450. Application 410 receives parameters for events from a user and transmit such events to collective mempool 450. In some embodiments, application 410 selects a set of hashing processors based on the received parameters. In some cases, the received parameters include information indicating that the user wants their event to be processed only by miners that are willing and able to process events that include ordinal inscriptions, such that selecting the set of hashing processors involves identifying and limiting the set of hashing processors that process the event to the hashing processors executing the custom mempool protocol and are able to process events that include ordinal inscriptions. Prior to transmitting events to collective mempool 450, application 410 digitally signs the events by a cryptographic private key of user 401 according to the public blockchain protocol.

Collective mempool 450 is a mempool of a set of hashing processors executing the custom mempool protocol. Collective mempool 450 includes a collection of events awaiting verifications and confirmation by the set of hashing processors. The collection of events includes events transmitted by application 410 or events with parameters satisfying a screening criterion. For example, the screening criterion identifies events associated with ordinal inscriptions. The events with parameters satisfying the screening criterion i.e., events associated ordinal inscriptions, are sent to hashing processors associated with collective mempool 450. While the greater network 480 propagates all events received (according to the public blockchain protocol), those events that satisfy the screening criterion are not propagated further.

In some embodiments, hashing processors 480*a* sends an event to hashing processors 450*a* (either directly or indirectly by transmissions through neighboring nodes), which determines whether parameters of the event satisfy a screening criterion. Hashing processors of the custom node only process/hash events to append to the public blockchain when the parameters of the event satisfy the screening criterion. Thus, collective mempool 450 only includes events that come from intentional sources, such as application 410, or events that were not filtered out based on screening criterion.

The set of hashing processors associated with collective mempool 450 executes a custom mempool protocol that is independent of the public blockchain protocol. The custom mempool protocol differs from the public blockchain protocol. For example, the set of hashing processors executing the custom mempool protocol hashes event transmitted by application 410 only into blocks with other events transmitted by application 410 or events with parameters satisfying a screening criterion. Further, the set of hashing processors executing the custom mempool protocol will not propagate events transmitted by application 410 to mempools of nodes that are not executing the custom mempool protocol. Thus, hashing processors 450*a* are selective about which events are hashed together into blocks for the blockchain, while hashing processors 480*a* would not receive events transmitted by application 410. In contrast, hashing processors executing the public blockchain protocol would typically hash events into blocks with any other events and also attempt to propagate events to mempools of all other nodes in the blockchain network. Thus, a user transmitting events from application 410 exercises choice over which custom set of hashing processors executing the custom mempool protocol process the user's events.

Embodiments described herein provide multiple benefits. One benefit is that a given user achieves intentionality or agency into which events appear in the same blocks on the blockchain on with their events. Since blocks hashed by hashing processors executing the custom mempool protocol will contain only events associated with ordinal inscriptions, users ensure that their events are not processed with other events that are not compatible with ordinal theory. Another benefit is that events processed under the custom mempool protocol are still compatible with the blockchain under the public blockchain protocol. For example, events processed under the custom mempool protocol are hashed into blocks, which are then be broadcast for appending to the blockchain data structure according to the public blockchain protocol. Thus, no changes have to be made to the existing public blockchain protocol.

Greater network/mempool 480 is the mempool of hashing processors of the greater blockchain network. The greater blockchain network includes hashing processors that execute the public blockchain protocol, like those of hashing processors 480*a*, as well as hashing processors that execute the custom mempool protocol, like those of hashing processors 450*a*. While not explicitly shown in FIG. 4, it is understood that there is a suitable network interface that enables nodes to communicate information to each other. In some embodiments, information is transmitted to nodes throughout the blockchain network by propagation of information to neighboring nodes, which then further propagate information to further neighboring nodes and so on until the information has reached all nodes meant to receive the information. As described above, nodes with hashing processors executing the custom mempool protocol choose to refrain from propagating information to mempools of nodes not executing the custom mempool protocol.

Figure 5:
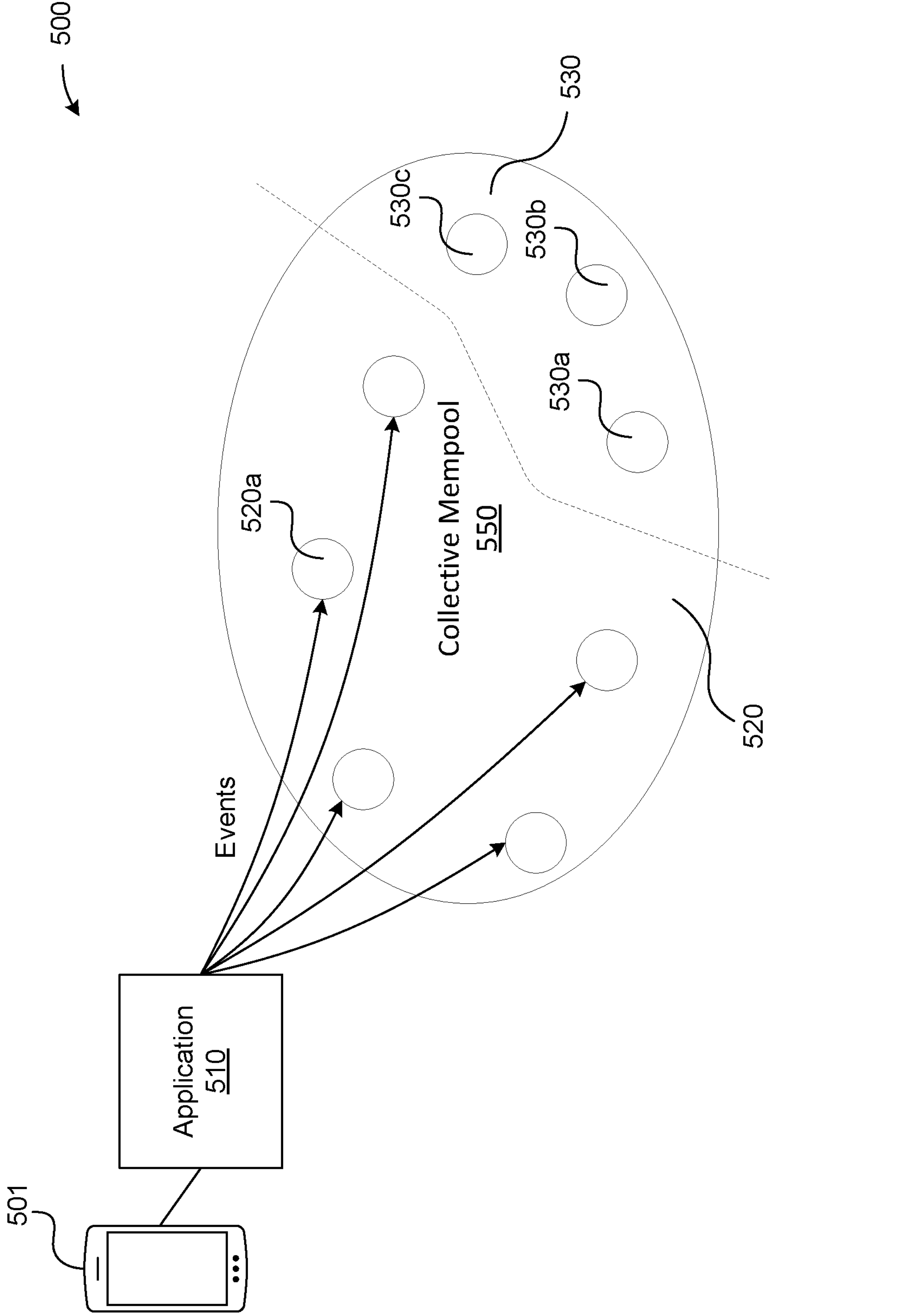
FIG. 5 is a diagrammatic representation of a system with a collective mempool from which a subset of hashing processors process events transmitted by an application.

FIG. 5 is a diagrammatic representation of a system 500 with a collective mempool from which a subset of hashing processors process events transmitted by an application. System 500 includes a user device 501 running an application 510, which transmits events to collective mempool 550 that is part of a greater network/mempool 580. Collective mempool 550 is a mempool of a set of hashing processors that executes a custom mempool protocol. Greater network/ mempool 580 is the mempool of hashing processors of the greater blockchain network, including those that execute the public blockchain protocol. In some embodiments, user device 501, application 510, collective mempool 550, and greater network/mempool 580 include similar characteristics to those described with respect to user device 401, application 410, collective mempool 450, and greater network/mempool of FIG. 4. Additional characteristics of system 600 are described below.

In some embodiments, collective mempool 550 is further split into subgroups delineated by criteria controlled by a mempool mining pool administrator (e.g., compatible with ordinal theory, hardware/software versions, legal policy compliance, etc.). For purposes of illustration, the mempool subgroups are portrayed via collective mempool 520 and collective mempool 530. The divide between hashing processors associated with collective mempool 520 and hashing processors associated with collective mempool 530 is depicted by a dotted line running through collective mempool 550. Collective mempool 520 is a mempool of a first subset of hashing processors executing the custom mempool protocol and collective mempool 530 is a mempool of a second subset of hashing processors executing the custom mempool protocol. While FIG. 5 depicts only two subsets of hashing processors of collective mempool 550, more subsets can exist.

Hashing processors 520*a* are part of a pool of hashing processors corresponding to collective mempool 520, hashing processors 530*a* are part of a pool of hashing processors corresponding to collective mempool 530, and hashing processors 580*a* is part of a pool of hashing processors corresponding to the greater network/mempool 580. Characteristics described herein with respect to hashing processors 520*a* apply to other hashing processors associated with collective mempool 520, characteristics described with respect to hashing processors 530*a* apply to other hashing processors associated with collective mempool 530, and characteristics described with respect to hashing processors 580*a* apply to other hashing processors that are part of the greater network/mempool 580.

In a given example, only hashing processors associated with collective mempool 520 receive an event transmitted by application 510. A user inputs parameters for an event into application 510 to indicate their choice as to what kind of hashing processors they would like to process their event. In some embodiments, the received parameters include information indicating that hashing processors be able to process events that include ordinal inscriptions. Application 510 determines that only the subset of hashing processors associated with collective mempool 520 (including hashing processors 520*a*) are able to process events that include ordinal inscriptions. Application 510 then only enables the subset of hashing processors associated with collective mempool 520 to receive and process the event. Thus, hashing processors 520*a* process the user's event, while hashing processors 530*a* do not. The user achieves intentionality as to which hashing processors process their events by further narrowing their selection of hashing processors out of the set of hashing processors executing the custom mempool protocol.

The depiction in FIG. 5 is for illustrative purposes only and is not limiting. For example, system 500 includes a plurality of user devices running application 510, each transmitting events or other information to collective mempool 550, collective mempool 520, or collective mempool 530. Further, collective mempool 550, collective mempool 520, collective mempool 530, and greater network/mempool 580 includes a different number of nodes than depicted in FIG. 5.

Figure 6:
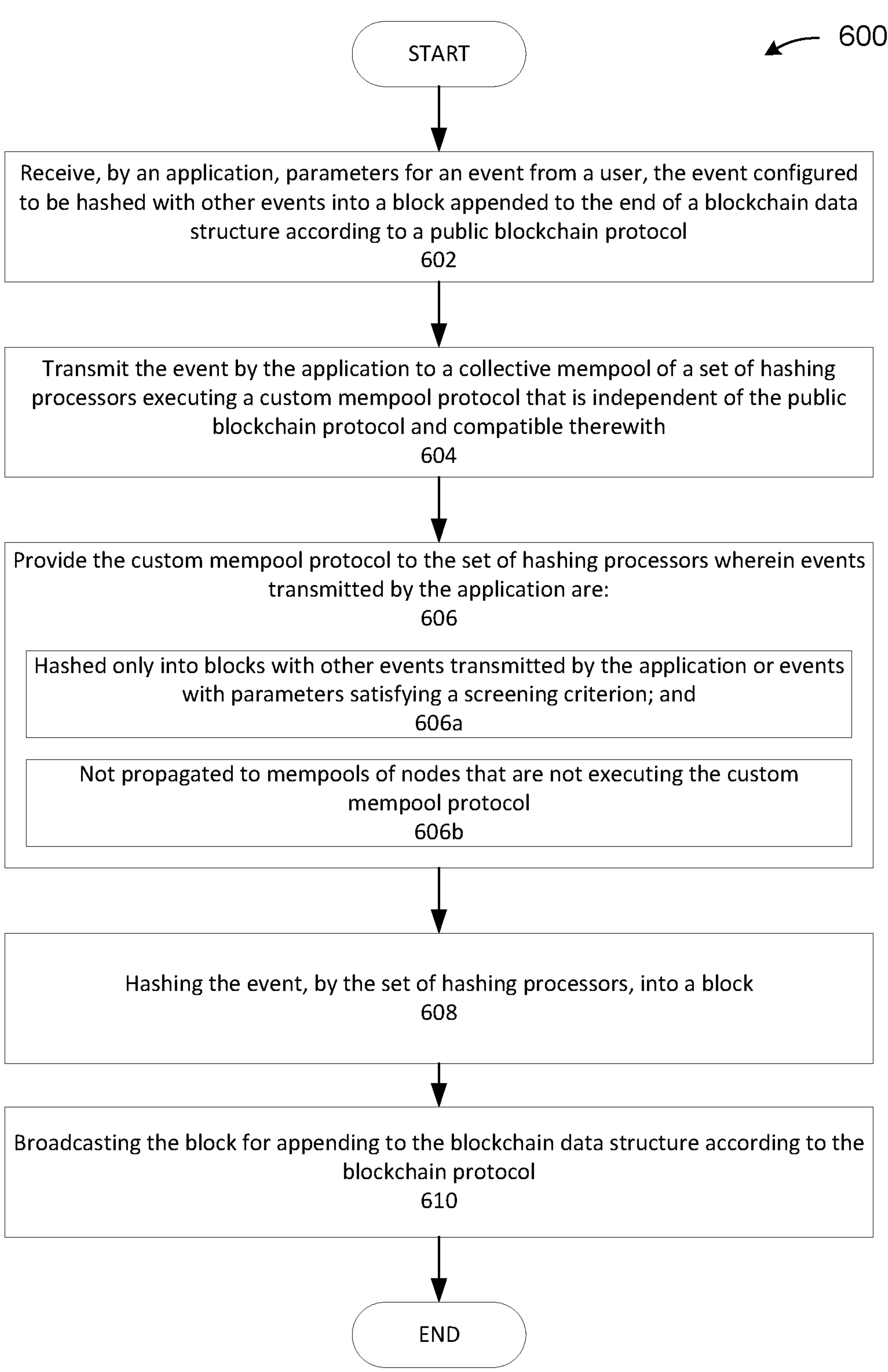
FIG. 6 is a flowchart illustrating operation of a pool of proof of work hashing processors and a custom mempool.

FIG. 6 is a flowchart 600 illustrating operation of a pool of proof of work hashing processors and a custom mempool. The steps described in flowchart 600 are carried out by systems such as system 400 of FIG. 4 or system 500 of FIG. 5, which include an application interfacing with hashing processors operating a custom mempool protocol. Some steps of flowchart 600 are described below with respect to components of FIG. 4 and FIG. 5.

At step 602, the application receives parameters for an event from a user. The event is configured to be hashed with other events into a block that is appended to the end of a blockchain data structure according to a public blockchain protocol. The user inputs the parameters using the application's user interface displayed on the user's device. For example, a user inputs parameters for an event into application 410 running on user device 401. The parameters include any pieces of information that indicate how the user prefers the event to be processed or characteristics of hashing processors that the user wishes to be used to process their event. For example, the information can indicate that the user wishes for the event to be processed by hashing processors that are able to process events that include ordinal inscriptions under ordinal theory.

At step 604, the application transmits the event to a collective mempool of a set of hashing processors executing a custom mempool protocol that is independent of the public blockchain protocol. For example, application 410 transmits an event to collective mempool 450. Collective mempool 550 is a mempool of a set of hashing processors, including hashing processors 450*a*, executing the custom mempool protocol. While hashing processors executing the custom mempool protocol process events differently from hashing processors executing the public blockchain protocol, blocks that are hashed under the custom mempool protocol are still compatible with the public blockchain protocol and are appended to the blockchain. In some embodiments, events transmitted by the application are digitally signed by a cryptographic private key of the user according to the public blockchain protocol.

At step 606, the system provides the custom mempool protocol to the set of hashing processors associated with the collective mempool. For example, system 400 provides the custom mempool protocol to the hashing processors associated with collective mempool 450, including hashing processors 450*a*. Providing the custom mempool protocol involves transmitting information to the receiving hashing processors that is used to properly execute the custom mempool protocol (e.g., instructions for executing the custom mempool protocol).

Events transmitted by the application to the collective mempool are processed according to the custom mempool protocol. Each event transmitted by the application is hashed only into blocks with other events transmitted by the application or events with parameters satisfying a screening criterion (step 606*a*). Further, each event transmitted by the application is not propagated to mempools of nodes that are not executing the custom mempool protocol (step 606*b*).

In an exemplary implementation of step 606*a*, events transmitted by application 410 to collective mempool 450 are hashed only into blocks with other events transmitted by application 410 or events received from greater network/mempool 480 but filtered based on screening criterion. In some embodiments, hashing processors associated with collective mempool 450 each filter events that are not received from application 410 i.e., events that are received from hashing processors of greater network/mempool 480. The filtering is conducted based on parameters associated with the events received from greater network/mempool 480. Thus, by transmitting their events by application 410, users achieve choice over what kinds of other events are hashed together in a block with the user's event.

In an exemplary implementation of step 606*b*, events transmitted by application 410 to collective mempool 450 are not propagated to mempools of nodes that are not executing the custom mempool protocol. While mempools of nodes in a public blockchain network typically attempt to propagate events to mempools of all other nodes in the network, nodes associated with collective mempool 450 choose to refrain from propagating events transmitted by application 410 to mempools of other nodes not executing the custom mempool protocol. Thus, hashing processors from greater network/mempool 480 executing the public blockchain protocol (e.g., hashing processors 480*a*) would not receive events transmitted by application 410 because hashing processors associated with collective mempool 450 (e.g., hashing processors 450*a*) choose not to propagate such events outside of collective mempool 450.

On the contrary, hashing processors executing the custom mempool protocol propagate events that were not received through the application to mempools of nodes that are not executing the custom mempool protocol. For example, hashing processors associated with collective mempool 450 propagate events received from hashing processors executing the public blockchain protocol (e.g., hashing processors 480*a*) to mempools of nodes outside of collective mempool 450. Thus, the custom mempool protocol allows events that are not transmitted by the application to be propagated to the greater blockchain network in accordance with the public blockchain protocol.

Some benefits of executing steps 606*a* and 606*b* include providing users more control over how their events are processed before getting added into the blockchain. Due to step 606*a*, events transmitted by the application are only hashed into blocks that contain only events that have been filtered based on screening criteria. Thus, events transmitted by the application are only added to the blockchain as part of blocks that include ordinal inscriptions. Further, due to step 606*b*, users prevent hashing processors outside of collective mempool 450 from processing their events transmitted by the application. By using the application, users ensure that their events are processed by a set of intentional hashing processors, rather than by other hashing processors in the public blockchain network about which the user has little or no information. The result of targeting a specific set of hashing processors for dissemination of an event is that a given user achieves some intentionality or agency into which events appear in the same blocks on the blockchain on with their events.

In some embodiments, events transmitted by the application are prioritized over other events not transmitted by the application. For example, the set of hashing processors executing the custom mempool protocol selects events transmitted by the application to be hashed into blocks before selecting other events that are not transmitted by the application. Events transmitted by the application are then added into blocks more quickly instead of remaining in mempools unprocessed.

At step 608, the set of hashing processors executing the custom mempool protocol hashes the event transmitted by the application into a block. For example, hashing processors associated with collective mempool 450 hash the event transmitted by application 410 into a block. While the block contains only events transmitted by the application or events with parameters satisfying a screening criterion, the block is hashed in the same way as other blocks on the blockchain data structure according to the public blockchain protocol.

At step 610, the block is broadcast for appending to the blockchain data structure according to the public blockchain protocol. The block is submitted to the public blockchain network, which verifies the block in accordance with the public blockchain protocol. Thus, no changes are made to the existing public blockchain protocol in order to add blocks including events processed under the custom mempool protocol.

In some embodiments, the set of hashing processors that process events transmitted by the application is further limited beyond the set of all hashing processors executing the custom mempool protocol. In some cases, prior to transmitting the event by the application to the collective mempool, the application selects the set of hashing processors based on the parameters received for the event. In an exemplary case, the parameters received for the event includes information indicating that hashing processors be able to process events that include ordinal inscriptions. Selecting the set of hashing processors then involves identifying the set of hashing processors executing the custom mempool protocol and are able to process events that include ordinal inscriptions, and then limiting the set of hashing processors that process the events to those identified.

An example of how the set of hashing processors that process events transmitted by the application is further limited is described with respect to system 500 of FIG. 5. User 501 inputs information indicating that the event includes ordinal inscriptions into application 510, indicating that they want the event to be processed only by hashing processors able to process events including ordinal inscriptions. Application 510 then selects the set of hashing processors executing the custom mempool protocol and are able to process events including ordinal inscriptions. In an exemplary case, the application identifies hashing processors associated with collective mempool 520 (including hashing processors 520*a*) as executing the custom mempool protocol. The application then limits the hashing processors to which the application transmits the event of user 501 to the hashing processors associated with collective mempool 520. Thus, hashing processors associated with collective mempool 530 (including hashing processors 530*a*) do not receive the event, even though they are executing the custom mempool protocol.

While flowchart 600 focuses on processing of one event transmitted by the application, it is understood that the system can process multiple transactions. In some embodiments, in addition to the first event of the first user described above, the application further receives parameters for a second event from a second user. Similar to the first event, the second event is configured to be hashed with other events into the block appended to the end of the blockchain data structure according to the public blockchain protocol. The application further transmits the second event to the collective mempool of the set of hashing processors executing the custom mempool protocol that is independent of the public blockchain protocol. The first event and the second event are present in the collective mempool at the same time. As a result, the set of hashing processors associated with the collective mempool hash the second event into the same block into which the first event of the first user was also hashed.

In some cases, when the system processes multiple events, the application selects different sets of hashing processors to process different events. For example, in addition to the first set of parameters of a first event received from the first user, the application further receives a second set of parameters for a second event from a second user. The second set of parameters is different from the first set of parameters. Similar to the first event, the second event is configured to be hashed with other events into the block appended to the end of the blockchain data structure according to the public blockchain protocol.

In some embodiments, the set of hashing processors used to process the first event is a first subset of hashing processors executing the custom mempool protocol. The application then further identifies, based on the second set of parameters for the second event, a second subset of hashing processors executing the custom mempool protocol that is independent of the public blockchain protocol. In some cases, the second subset of hashing processors is different from the first subset of hashing processors. The application transmits the second event to the second subset of hashing processors executing the custom mempool protocol, which then hashes the second event into the second block. Finally, the second block is broadcast for appending to the blockchain data structure according to the public blockchain protocol.

An example of how the application selects different subsets of hashing processors to process different events is described with respect to system 500 of FIG. 5. User 501 inputs into application 510 parameters including information indicating that user 501 wishes to use hashing processors that are able process events that include ordinal inscriptions for a first event. Upon identifying that the hashing processors associated with collective mempool 520 are able to process events that include ordinal inscriptions, application 510 then selects those hashing processors associated with collective mempool 520 to process the first event. Further, a second user other than user 501 inputs into application 510 parameters including information indicating that the second user wishes to use hashing processors that are able to process events that include ordinal inscriptions for a second event. Upon identifying that the hashing processors associated with collective mempool 530 are also able to process events that include ordinal inscriptions, application 510 then selects those hashing processors associated with collective mempool 530 to process the second event. Application 510 then sends the first event to the hashing processors associated with collective mempool 520 and sends the second event to the hashing processors associated with collective mempool 530. Accordingly, the first and second events are processed by different subsets of hashing processors that execute the custom mempool protocol. Both the first user and the second user exercise intentionality and agency over which hashing processors process their respective events.

Ordinals on the Blockchain

Several updates to Bitcoin led to the support of ordinals and inscriptions on the blockchain. For example, the Segregated Witness (SegWit) update segregated Bitcoin transactions into two sections by separating the signature portion and instead adding a witness data field at the end of a block. The creation of the witness data field relaxed the previous limitations on block size and thus expanded the amount of arbitrary content that could be placed inside a Bitcoin transaction.

Further, the Taproot upgrade aimed to simplify, while improving privacy and security of, complex Bitcoin transactions. Complex transactions, such as time-locked smart contracts, typically required multiple signatures and an addition of a large amount of data to the blockchain. The Taproot upgrade enhanced Bitcoin transactions for complex transactions (e.g., by combining public keys to create a single public key and combining signatures into one signature to hide identities). This reduced the amount of data needed and lowered costs to complete the transactions. Further, the Taproot upgrade provided a new transaction output type called Pay-to-Taproot (P2TR), a type of script, and a collection of operation codes (opcodes) for executing commands on the Bitcoin protocol. These opcodes removed the cap on script size limits, allowing for larger scripts and greater flexibility. While only limited textual content could be added to transactions previously, the Taproot upgrade expanded the types of content (e.g., videos, images, audio, games, etc.) that could be put onto the blockchain.

Ordinals and inscriptions provide a way to add arbitrary content (e.g., videos, images, audio data, etc.) to an individual satoshi on the blockchain, where a satoshi is equivalent to the smallest possible unit of Bitcoin. Ordinals follow an ordering system that enables differentiation amongst satoshis by assigning each satoshi a unique identifier (e.g., unique ordinal number) based on the order in which it was mined. An inscription is the arbitrary content that is inscribed to a satoshi, typically by being embedded into the witness data section of a transaction. Inscriptions are unchangeable once inscribed and are meant to be durable, secure, and decentralized like Bitcoin. An ordinal inscribed with arbitrary content can be held in a Bitcoin wallet (e.g., Taproot-compatible wallet) and transferred using typical Bitcoin transactions. Ordinals and inscriptions do not require any changes public blockchain protocol and are compatible with the existing public blockchain protocol.

Figure 7:
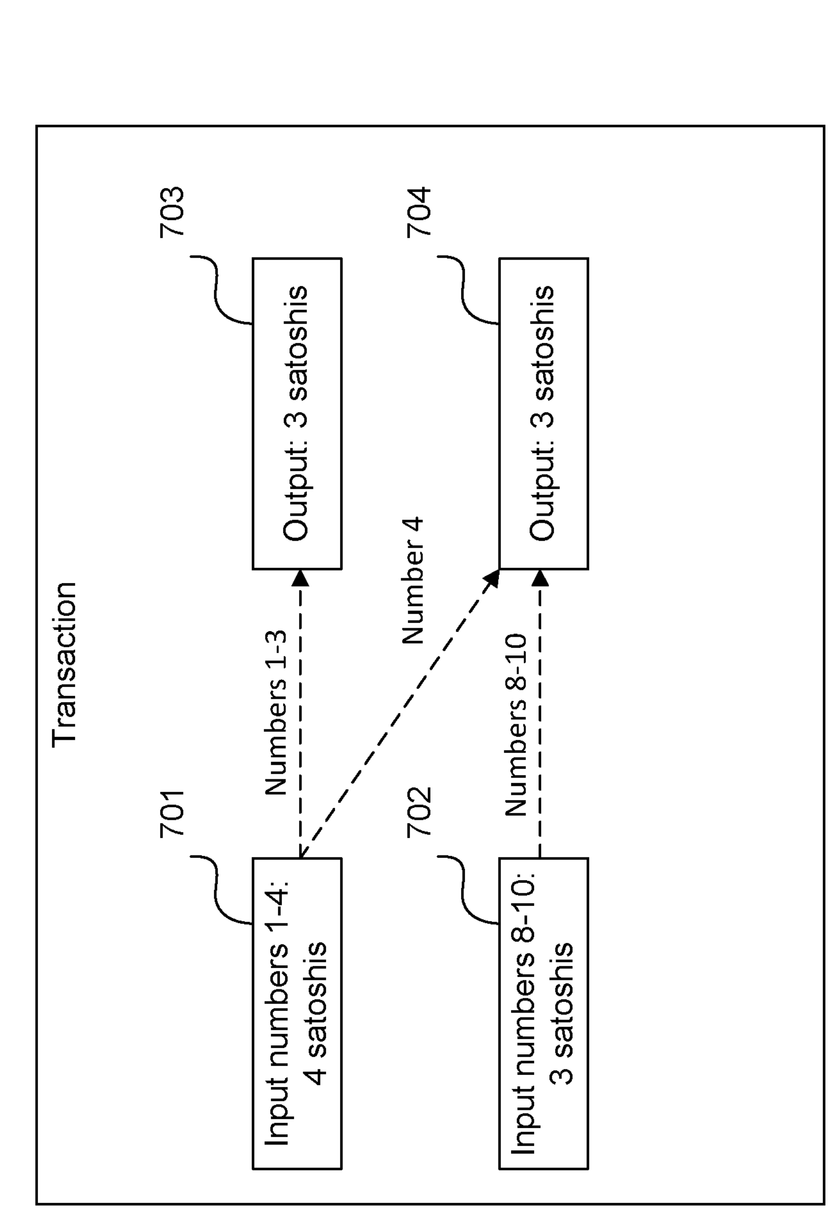
FIG. 7 provides exemplary inputs and outputs of a transaction under ordinal theory.

FIG. 7 provides exemplary inputs and outputs of a transaction 700 under ordinal theory. Typically, an output of a transaction is also an input of another transaction. Any output that is not also an input of another transaction is considered an unspent transaction output (UTXO). The UTXO associated with a certain address thus indicates the remaining balance at that address. Under ordinal theory, satoshis that live in the UTXO are each assigned a unique identifier (e.g., unique ordinal number). Once the satoshis are selected as transaction inputs, those satoshis are transferred to transaction outputs in a first-in-first-out (FIFO) order.

Transaction 700 involves inputs 701 and 702, which are made up of satoshis that were UTXOs. Input 701 is made up of 4 satoshis and input 702 of 3 satoshis. Each of these satoshi inputs are assigned a number, such as 1 through 4 for input 701 and 8 through 10 for input 702. These satoshi inputs are then assigned in the order that they are numbered to the first available output. For example, outputs 703 and 704 are made up of 3 satoshis each. The input satoshis 1 through 3 are assigned to output 703 and the input satoshis 4, 8, and 9 are assigned to output 704. The input satoshi 10 is used as the transaction fee for transaction 700.

Each of the satoshis involved in transaction 700 can be inscribed with arbitrary content. The inscription process involves a procedure that recognizes that the satoshi is an ordinal, designates the content type to be inscribed, and adds the contents into the witness data field. The contents are added into sections of a transaction indicated by certain opcodes (e.g., OP_FALSE, OP_PUSH). The amount of content that can be inscribed is limited to the size of a block, though such size was expanded (e.g., to 4 MB) by the SegWit update described above.

Figure 8:
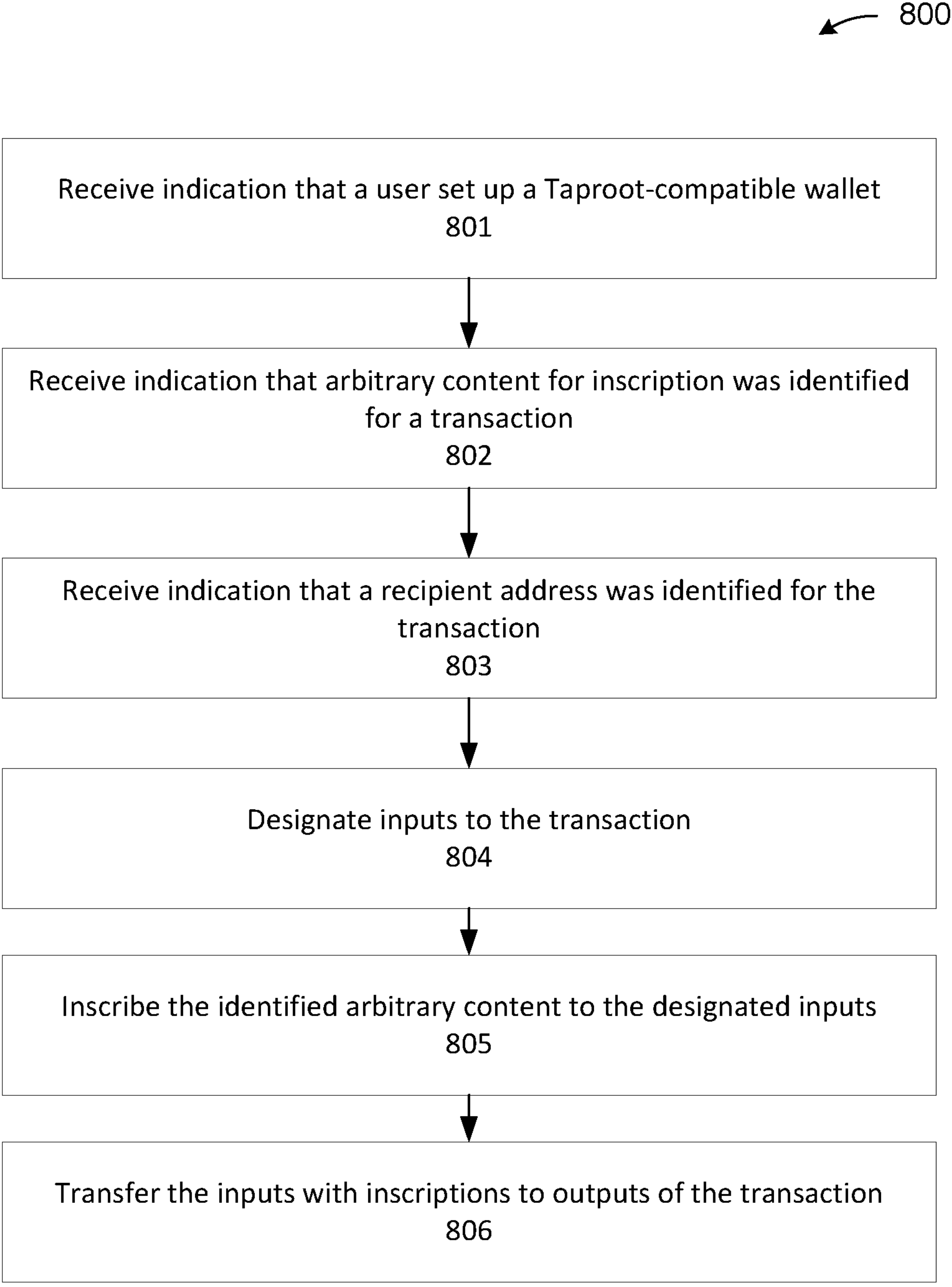
FIG. 8 provides a flowchart of inscribing multiple ordinals in a transaction.

FIG. 8 provides a flowchart 800 of inscribing multiple ordinals in a transaction. While flowchart 800 shows one exemplary option for inscribing multiple ordinals in a transaction, other options are available. For example, the system can also generate the Taproot-compatible wallet that contains the revealed inscriptions dynamically and provide the user with the private key corresponding to the Taproot-compatible wallet.

At step 801, the system receives an indication that a user signed up for a Taproot-compatible wallet. For example, the system receives an indication that the user signed up for a Taproot-compatible wallet by downloading a mobile or web app that sets up a wallet associated with a taproot wallet address. The wallet is connected to an inscription service. The wallet and inscription service provide interactive user interfaces that allow the user to perform the steps described herein. At step 802, the system receives an indication that arbitrary content for inscription was identified for a transaction. In some embodiments, the user identifies the desired arbitrary content that they wish to inscribe by selecting one or more files on their device. The arbitrary content can be of any data type that fits within the expanded blocksize limit (e.g., 4 MB). For example, the arbitrary content can be a video (e.g., .mp4, etc.), image (e.g., .jpg, .png, etc.), audio, script, text, document, or other file. The selected arbitrary content is uploaded. In other embodiments, the user uses their device to enter content (e.g., typing or writing out text, drawing a picture). In response to the user's selection, the system receives the arbitrary content identified by the user.

At step 803, the system receives an indication that a recipient address was identified for the transaction. The recipient address indicates where the transaction should be sent. In some embodiments, the user uses their device to enter their Taproot recipient address associated with their Taproot-compatible wallet to receive their inscribed ordinal. In other embodiments, the user identifies a destination (e.g., an account) and the system retrieves the Taproot recipient address associated with the identified destination in response. In some embodiments, the system further receives a confirmation (e.g., through a button click) that the user wishes to proceed with the inscription of the identified arbitrary content.

At step 804, the system designates a number (e.g., 1 to n) of UTXOs as inputs to the transaction. These UTXOs are satoshis that follow ordinal theory and thus are assigned a unique identifier.

At step 805, the system inscribes the identified arbitrary content to the designated inputs. Exemplary transaction outputs include scripts or public key addresses. In some embodiments, the transaction output is a P2TR script. The P2TR script allows for the identified arbitrary content to be embedded into the witness data field of the transaction. This is done by using opcodes that prevent the Bitcoin node from validating the portion of the script that follows until a size limit is reached and further opcodes are used to continue inscribing. For example, the P2TR script envelopes the identified arbitrary content in an unexecuted conditional consisting of opcodes (e.g., OP_FALSE, OP_IF, and OP_ENDIF). The identified content can be pushed (e.g., using the opcode OP_PUSH) within these opcodes. In some embodiments, identified content can be included through multiple pushes. Once the size limit is reached or no further inscriptions are desired (e.g., indicated by the opcode OP_ENDIF), the script is validated and the transaction can be completed. By creating a transaction with UTXO inputs and transaction fees sufficient to allow for the inscription of multiple ordinals, any number of outputs can be ordinal inscriptions as the user wishes.

At step 806, the inputs with inscriptions are transferred to outputs of the transaction. The inputs are transferred to the outputs in a FIFO manner as described with respect to FIG. 7.

In some embodiments, inscription of the identified arbitrary content is accomplished by two transactions. The first transaction is considered the "commit" transaction of the ordinal inscription. For the "commit" transaction, the system generates a P2TR address that embodies the P2TR script, which includes the identified arbitrary content for the ordinal. The system then sends satoshis, including those to be inscribed, to the Public Address of the P2TR script. The second transaction is considered the "reveal" transaction. For the "reveal" transaction, when the user indicates that they wish to reveal the ordinal, the system spends the output to the address where the user wishes to keep the ordinal for sale or storage. The ordinal inscription is added to the blockchain at this point, since the full P2TR script is used for signing the "reveal" transaction.

An exemplary script including inscription of ordinals is provided below. Opcodes OP_FALSE and OP_IF indicate the start of the inscription, which includes multiple pushes of content until the end of the inscription indicated by opcode OP_END_IF. In this example, a mp4 video is inscribed followed by additional content of 520 bytes.

```
01000000 VERSION
0001
01 One input
7a7f102504a943a6edc738b44001e9a6481d92aec654b608d69735b42cdefd6e
TRANSACTION HASH
00000000 VOUT
00 NO PUSH TO SCRIPT SIG
fdffffff SEQ
01 ONE OUTPUT
1027000000000000 VALUE
22 PUSH 22
51 OP 1 WITNESS VERSION 1 (TAPROOT)
20 PUSH 32 bytes
37bd287c91cd7c3da72edd98f0bccdd2945cc9762b49cc2d1e42964d202ff90d THE
BECH32m address decoded
03 THREE ELEMENTS ON WITNESS STACK
40 FIRST PUSH 64 BYTES
THIS ELEMENT IS THE INITIAL STACK WHEN THE TAPSCRIPT IS EXECUTED
a03c2deaee864a5017ce69714a1f43ced0b279663f75a132b2ab85da9445afa87dbcea7718f4aed
54e57ffcf987728a54fcfc2efea4544ee3b43019013d1e2cb
```

-continued

```
fe43de3300 SECOND STACK ELEMENT (3399235 bytes), THIS IS CALLED THE
SCRIPT BLOCK IN A P2TR. IT INCLUDES THE EXECUTED TAPSCRIPT
20 PUSH 32 BYTES
ff4262553fd0a2ab453bd092f819f91877f8b3bf07a1be9f856de686bd9429c2 PUBKEY
ac OP CHECK SIG, NOTE THIS CHECKS WITH SCHNORR NOT NORMAL ECDSA
00 OP__FALSE (START OF INSCRIPTION)
63 OP__IF
03 PUSH__3
6f7264 "ord" encoded
01
01 PUSH A 1 ONTO THE STACK
09
766964656f2f6d7034 "video/mp4"
00 OP__FALSE
4d0802 PUSH 520 BYTES FOLLOWED BY ORDINAL CONTENT,.. THIS CONTINUES
UNTIL THE WHOLE DIGITAL ASSET IS PUSHED
000000206674797069736f6d0000020069736f6d69736f32617663316d7034310000af196d6f
6f760000006c6d766864000000000000000000000000000003e80000fcab0001000001000000
000000000000000000010000000000000000000000000000000001000000000000000000000000
000040000000000000000000000000000000000000000000000000000000000000000300005e
067472616b0000005c746b686400000003000000000000000000000000010000000000000fc880
000000000000000000000000000000000010000000000000000000000000000000000100000000
000000000000000000000400000000007c000000d600000000000024656474....
68 OP__END__IF
THIS IS THE CONTROL BLOCK IN THE WITNESS STACK
21 PUSH 33 BYTES ONTO WITNESS STACK 0xc0 is leaf version
c0ff4262553fd0a2ab453bd092f819f91877f8b3bf07a1be9f856de686bd9429c2 SOME
TAPSCRIPT
00000000 LOCK TIME
```

Figure 9:
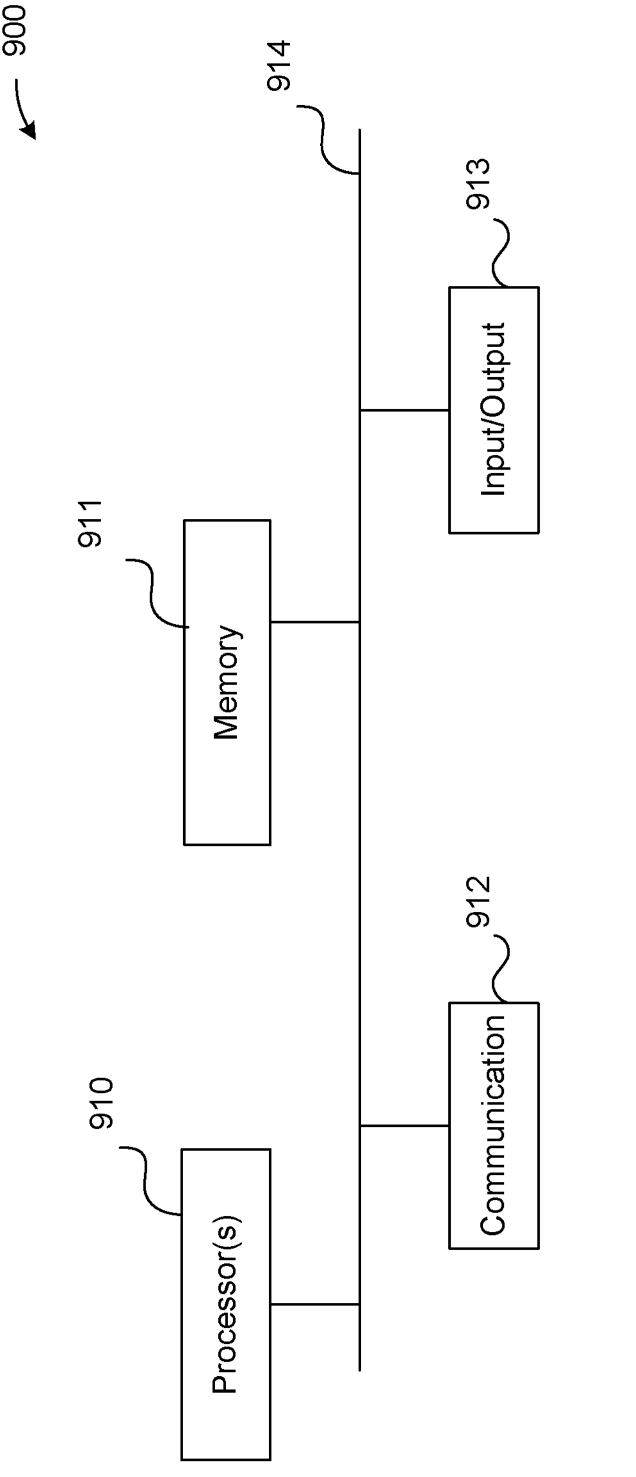
FIG. 9 is a block diagram of an exemplary computing system.

FIG. 9 is a high-level block diagram showing an example of a processing device 900 that can represent a system to run any of the methods/algorithms described above. A processing device used to "mine" cryptographic objects is often evaluated based on a hash rate and an electrical power efficiency. A system may include two or more processing devices such as represented in FIG. 9, which may be coupled to each other via a network or multiple networks. A network can be referred to as a communication network.

In the illustrated embodiment, the processing device 900 includes one or more processors 910, memory 911, a communication device 912, and one or more input/output (I/O) devices 913, all coupled to each other through an interconnect 914. The interconnect 914 may be or include one or more conductive traces, buses, point-to-point connections, controllers, scanners, adapters and/or other conventional connection devices. Each processor 910 may be or include, for example, one or more general-purpose programmable microprocessors or microprocessor cores, microcontrollers, application specific integrated circuits (ASICs), programmable gate arrays, or the like, or a combination of such devices. The processor(s) 910 control the overall operation of the processing device 900. Memory 911 may be or include one or more physical storage devices, which may be in the form of random-access memory (RAM), read-only memory (ROM) (which may be erasable and programmable), flash memory, miniature hard disk drive, or other suitable type of storage device, or a combination of such devices. Memory 911 may store data and instructions that configure the processor(s) 910 to execute operations in accordance with the techniques described above. The communication device 912 may be or include, for example, an Ethernet adapter, cable modem, Wi-Fi adapter, cellular transceiver, Bluetooth transceiver, or the like, or a combination thereof. Depending on the specific nature and purpose of the processing device 900, the I/O devices 913 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 900 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for hashing ordinals under a modified blockchain protocol for blockchain events following ordinal theory comprising:

receiving content associated with multiple ordinals in connection with a blockchain event;

assigning ordinal identifiers to unspent inputs for the blockchain event;

embedding the content associated with the multiple ordinals into one or more data fields of the unspent inputs;

transferring the unspent inputs to a plurality of blockchain event outputs;

hashing the plurality of blockchain event outputs including the embedded content associated with the multiple ordinals into a block; and broadcasting the block for appending to a blockchain data structure according to the modified blockchain protocol for blockchain events following ordinal theory.

2. The method of claim 1, wherein embedding the content associated with the multiple ordinals into the one or more data fields of the unspent inputs comprises:

identifying a first set of limiting identifiers associated with a first ordinal;

pushing a first portion of the content associated with the first ordinal into the one or more data fields consistent with the first set of limiting identifiers;

identifying a second set of limiting identifiers associated with a second ordinal; and pushing a second portion of the content associated with the second ordinal into the one or more data fields consistent with the second set of limiting identifiers.

3. The method of claim 1, wherein receiving the content associated with the multiple ordinals in connection with the blockchain event comprises:

receiving an indication that a user provided the content for the blockchain event through an interface on a user device; and receiving the content from the user device.

4. The method of claim 1, wherein receiving the content associated with the multiple ordinals in connection with the blockchain event comprises:

dynamically generating the content for the blockchain event.

5. The method of claim 1, wherein transferring the unspent inputs to the plurality of blockchain event outputs comprises:

determining an ordering of the plurality of blockchain event outputs; and assigning the unspent inputs to the plurality of blockchain event outputs in a first-in first-out (FIFO) order based on the ordinal identifiers assigned to the unspent inputs and the ordering of the plurality of blockchain event outputs.

6. The method of claim 1, wherein the content associated with the multiple ordinals includes a combination of video data, image data, or audio data.

7. The method of claim 1, wherein the block includes only blockchain events that include embedded content associated with ordinals.

8. A non-transitory computer-readable storage medium storing instructions that, when executed by a computing system, cause the computing system to perform a process for hashing ordinals under a modified blockchain protocol for blockchain events following ordinal theory comprising:

receiving content associated with multiple ordinals in connection with a blockchain event;

assigning ordinal identifiers to unspent inputs for the blockchain event;

embedding the content associated with the multiple ordinals into one or more data fields of the unspent inputs;

transferring the unspent inputs to a plurality of blockchain event outputs;

hashing the plurality of blockchain event outputs including the embedded content associated with the multiple ordinals into a block; and broadcasting the block for appending to a blockchain data structure according to the modified blockchain protocol for blockchain events following ordinal theory.

9. The non-transitory computer-readable storage medium of claim 8, wherein embedding the content associated with the multiple ordinals into the one or more data fields of the unspent inputs comprises:

identifying a first set of limiting identifiers associated with a first ordinal;

pushing a first portion of the content associated with the first ordinal into the one or more data fields consistent with the first set of limiting identifiers;

identifying a second set of limiting identifiers associated with a second ordinal; and pushing a second portion of the content associated with the second ordinal into the one or more data fields consistent with the second set of limiting identifiers.

10. The non-transitory computer-readable storage medium of claim 8, wherein receiving the content associated with the multiple ordinals in connection with the blockchain event comprises:

receiving an indication that a user provided the content for the blockchain event through an interface on a user device; and receiving the content from the user device.

11. The non-transitory computer-readable storage medium of claim 8, wherein receiving the content associated with the multiple ordinals in connection with the blockchain event comprises:

dynamically generating the content for the blockchain event.

12. The non-transitory computer-readable storage medium of claim 8, wherein transferring the unspent inputs to the plurality of blockchain event outputs comprises:

determining an ordering of the plurality of blockchain event outputs; and assigning the unspent inputs to the plurality of blockchain event outputs in a first-in first-out (FIFO) order based on the ordinal identifiers assigned to the unspent inputs and the ordering of the plurality of blockchain event outputs.

13. The non-transitory computer-readable storage medium of claim 8, wherein the content associated with the multiple ordinals includes a combination of video data, image data, or audio data.

14. The non-transitory computer-readable storage medium of claim 8, wherein the block includes only blockchain events that include embedded content associated with ordinals.

15. A system comprising:

hashing processors; and a memory including instructions that when executed cause the memory to receive content associated with multiple ordinals in connection with a blockchain event, assign ordinal identifiers to unspent inputs for the blockchain event, embed the content associated with the multiple ordinals into one or more data fields of the unspent inputs, and transferring the unspent inputs to a plurality of blockchain event outputs, and wherein the memory includes further instructions that when executed cause the hashing processors to hash the plurality of blockchain event outputs including the embedded content associated with the multiple ordinals into a block and broadcast the block for appending to a blockchain data structure according to a modified blockchain protocol for blockchain events following ordinal theory.

16. The system of claim 15, wherein the instructions for embedding the content associated with the multiple ordinals into the one or more data fields of the unspent inputs comprises instructions for:

identifying a first set of limiting identifiers associated with a first ordinal;

pushing a first portion of the content associated with the first ordinal into the one or more data fields consistent with the first set of limiting identifiers;

identifying a second set of limiting identifiers associated with a second ordinal; and pushing a second portion of the content associated with the second ordinal into the one or more data fields consistent with the second set of limiting identifiers.

17. The system of claim 15, wherein the instructions for receiving the content associated with the multiple ordinals in connection with the blockchain event comprises instructions for:

receiving an indication that a user provided the content for the blockchain event through an interface on a user device; and receiving the content from the user device.

18. The system of claim 15, wherein the instructions for receiving the content associated with the multiple ordinals in connection with the blockchain event comprises instructions for:

dynamically generating the content for the blockchain event.

19. The system of claim 15, wherein the instructions for transferring the unspent inputs to the plurality of blockchain event outputs comprises instructions for:

determining an ordering of the plurality of blockchain event outputs; and assigning the unspent inputs to the plurality of blockchain event outputs in a first-in first-out (FIFO) order based on the ordinal identifiers assigned to the unspent inputs and the ordering of the plurality of blockchain event outputs.

20. The system of claim 15, wherein the content associated with the multiple ordinals includes a combination of video data, image data, or audio data.

* * * * *